US008822077B2

(12) United States Patent
Katoh

(10) Patent No.: US 8,822,077 B2
(45) Date of Patent: Sep. 2, 2014

(54) LITHIUM SECONDARY BATTERY AND ELECTRODE FOR LITHIUM SECONDARY BATTERY

(75) Inventor: Takashi Katoh, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 1558 days.

(21) Appl. No.: 12/107,446

(22) Filed: Apr. 22, 2008

(65) Prior Publication Data

US 2008/0268348 A1  Oct. 30, 2008

(30) Foreign Application Priority Data

Apr. 27, 2007 (JP) ................................. 2007-120112

(51) Int. Cl.
| | |
|---|---|
| *H01M 6/18* | (2006.01) |
| *H01M 2/16* | (2006.01) |
| *H01M 4/38* | (2006.01) |
| *H01M 4/134* | (2010.01) |
| *H01M 10/0562* | (2010.01) |
| *H01M 4/40* | (2006.01) |
| *H01M 10/0565* | (2010.01) |

(52) U.S. Cl.
CPC .......... *H01M 10/0562* (2013.01); *H01M 4/405* (2013.01); *H01M 6/18* (2013.01); *H01M 2/1673* (2013.01); *H01M 10/0565* (2013.01); *H01M 4/382* (2013.01); *H01M 4/134* (2013.01); *Y02E 60/122* (2013.01)
USPC .................. 429/231.5; 429/231.95; 429/322; 429/323; 429/304

(58) Field of Classification Search
CPC ..................... H01M 10/0562; H01M 10/0565; H01M 4/134; H01M 4/382; H01M 4/405; H01M 2/1673; H01M 6/18

USPC .................. 429/322, 323, 304, 231.5, 231.95
See application file for complete search history.

(56) References Cited

U.S. PATENT DOCUMENTS

| | | | | | |
|---|---|---|---|---|---|
| 5,432,029 | A | * | 7/1995 | Mitate et al. .................. | 429/341 |
| 6,365,300 | B1 | * | 4/2002 | Ota et al. ...................... | 429/188 |
| 2002/0006552 | A1 | * | 1/2002 | Ishida et al. .................. | 429/209 |
| 2004/0197641 | A1 | * | 10/2004 | Visco et al. ................... | 429/246 |
| 2008/0268346 | A1 | | 10/2008 | Inda | |

FOREIGN PATENT DOCUMENTS

| | | | |
|---|---|---|---|
| JP | 62-195854 | * | 8/1987 |
| JP | 2004-259618 A | | 9/2004 |
| JP | 2004-296108 A | | 10/2004 |
| JP | 2006-086102 A | | 3/2006 |
| JP | 2006-147268 A | | 6/2006 |
| JP | 2007-5267 | * | 1/2007 |
| JP | 2007-005267 A | | 1/2007 |

* cited by examiner

*Primary Examiner* — Laura Weiner
(74) *Attorney, Agent, or Firm* — Westerman, Hattori, Daniels & Adrian, LLP

(57) ABSTRACT

An object of the invention is to provide a lithium secondary battery using a fused salt at ambient temperature where a high capacity is able to be maintained even when it is stored at a high temperature environment or even when it is subjected to charge and discharge repeatedly and also to provide an electrode for a nonaqueous electrolytic lithium secondary battery. There is disclosed a lithium secondary battery using at least a fused salt at ambient temperature having ionic conductivity in which at least one of the positive and negative electrode contains a powder which solely comprises an inorganic solid electrolyte having lithium ionic conductivity. There is also disclosed an electrode for a lithium secondary battery using, at least, a ionic liquid having ionic conductivity which contains a powder solely comprising inorganic solid electrolyte having lithium ionic conductivity.

10 Claims, No Drawings

LITHIUM SECONDARY BATTERY AND ELECTRODE FOR LITHIUM SECONDARY BATTERY

CROSS REFERENCE TO RELATED APPLICATIONS

The present invention contains subject matters related to Japanese Patent Application No. 2007/120,112 filed with the Japan Patent Office on Apr. 27, 2007, the entire contents of which being incorporated herein by reference.

BACKGROUND OF THE INVENTION

1. Field of the Invention

The present invention relates to a lithium secondary battery and to electrodes for a lithium secondary battery.

2. Description of the Related Art

As a result of miniaturization of electronic instruments, there has been an increasing demand, in a battery used as an electric source, for the development of secondary battery which is small in size, light in weight and high in energy density and is also able to be charged and discharged repeatedly.

With regard to a secondary battery meeting such a demand, a secondary battery using a nonaqueous electrolyte has been practically used and such a battery has several times higher energy density as compared with the conventional battery using an aqueous electrolyte. An example is a nonaqueous electrolyte secondary battery in which a lithium-cobalt composite oxide, a lithium-nickel composite oxide or a lithium-manganese composite oxide is used for a positive electrode and an alloy or a carbon material is used for a negative electrode.

Since a combustible organic solvent is used as an electrolyte in the above nonaqueous electrolyte secondary battery, there is a problem that, in the case of overcharge or the like, a thermally unstable state is resulted and properties of the battery are deteriorated due to side reactions other than the battery reaction and, in addition, there is a possibility that safety of the battery is greatly spoiled due to burning of the organic solvent.

Patent Document 1: Gazette of Japanese Patent Laid-Open No. 2007/005,267

Patent Document 2: Gazette of Japanese Patent Laid-Open No. 2004/296,108

SUMMARY OF THE INVENTION

As a result of the progress where capacity of a lithium secondary battery becomes high as such, safety of the battery is now becoming a big problem at the same time. For example, there is a case where, when a battery is in a state of high temperature upon charging, a chemical reaction takes place between a nonaqueous electrolyte and an active material for an electrode whereupon an exothermic phenomenon is resulted.

Therefore, in recent years, there has been carried out a development in which a fused salt at ambient temperature which is liquid at room temperature being constituted only from ions is used as an electrolyte for a secondary battery.

A fused salt at ambient temperature is receiving public attention as an incombustible and nonvolatile liquid electrolyte solvent and it is expected to enhance the safety of a battery when the salt is applied to a lithium secondary battery.

The fused salt at ambient temperature mentioned hereinabove stands for a salt which is constituted only from ions where a least a part of it shows a liquid state at ambient temperature and is a mixture with lithium ion.

In lithium batteries using a fused salt at ambient temperature which have been reported up to now, there has been used a material in which voltage of a negative electrode is high to an extent of not less than 1 V as compared with the potential of lithium metal and, when such a material is used, energy density becomes low as compared with a battery where a nonaqueous electrolyte is used. This is because of the necessity of using a material having relatively high potential as a negative electrode material since stability of a fused salt at ambient temperature against the reduction is low. Further, when a lithium-cobalt composite oxide, a lithium-nickel composite salt or a lithium-manganese composite oxide is used for a positive electrode in a lithium secondary battery using a fused salt at ambient temperature, there is a problem of insufficient cycle stability and storage characteristic such as lowering of discharge capacity and lowering of capacity upon storage under high temperature environment as a result of progress of a charge-discharge cycle under high voltage.

The present invention has been proposed under such circumstances and its object is provide a lithium secondary battery using a fused salt at ambient temperature where a high capacity is able to be maintained even when it is stored under a high temperature environment and even when it is subjected to repeated charge and discharge and also to provide an electrode for an electrode for a nonaqueous electrolyte lithium secondary battery.

The present inventor has conducted intensive studies for solving the above problems and found that, in a lithium secondary battery using at least a fused salt at ambient temperature having an ionic conductivity as an electrolyte (electrolytic solution), when powder solely comprising an inorganic solid electrolyte having ionic conductivity is used for an positive electrode and a negative electrode or for any of them, it is now possible to prepare a lithium secondary battery in which chemical reaction of an electrolyte with an active material for electrode is suppressed, lowering of properties of the electrolyte is suppressed and reliability is high even at a high temperature environment.

To be more specific, preferred embodiments of the present invention are able to be represented by the following constitutions.

(Constitution 1)

A lithium secondary battery using at least a fused salt at ambient temperature having ionic conductivity in which at least one of positive and negative electrodes contains a powder which solely comprises an inorganic solid electrolyte having lithium ionic conductivity.

(Constitution 2)

The lithium secondary battery according to the constitution 1, wherein the inorganic solid electrolyte comprises at least one of an oxide containing lithium, a compound containing lithium and halogen and a compound containing lithium and nitrogen.

(Constitution 3)

The lithium secondary battery according to the constitution 1 or 2, wherein the inorganic solid electrolyte contains crystals of $Li_{1+x+z}M_x(Ge_{1-y}Ti_y)_{2-x}Si_zP_{3-z}O_{12}$ (in which $0 \leq x \leq 0.8$, $0 \leq y \leq 1.0$, $0 \leq z \leq 0.6$ and M is one or more element(s) selected from Al and Ga).

(Constitution 4)

The lithium secondary battery according to any of the constitutions 1 to 3, wherein at least one of the positive electrode and the negative electrode contains a polymeric solid electrolyte which absorbs the salt fused at ambient temperature having ionic conductivity.

(Constitution 5)
The lithium secondary battery according to any of the constitutions 1 to 3, wherein a separator positioned between the positive electrode and the negative electrode is equipped therewith.

(Constitution 6)
The lithium secondary battery according to the constitution 3, wherein the crystals are substantially free of a pore or a crystal grain boundary which inhibits the ionic conductivity.

(Constitution 7)
The lithium secondary battery according to any of the constitutions 1 to 6, wherein the inorganic solid electrolyte is a lithium composite oxide glass ceramics.

(Constitution 8)
The lithium secondary battery according to any of the constitutions 1 to 7, wherein the amount of the powder in the electrode is 0.1% by weight to 30% by weight to an electrode mixture containing it.

(Constitution 9)
The lithium secondary battery according to any of the constitutions 1 to 8, wherein, when an average particle size of the powder is d and an average particle size of the active material in the electrode containing it is D, then d/D is from 0.002 to 200.

(Constitution 10)
The lithium secondary battery according to any of the constitutions 1 to 9, wherein an average particle size of the powder is not more than 20 μm.

(Constitution 11)
An electrode for a lithium secondary battery using, at least, an ionic liquid having ionic conductivity which contains a powder solely comprising an inorganic solid electrolyte having lithium ionic conductivity.

(Constitution 12)
The electrode according to the constitution 11, wherein the inorganic solid electrolyte comprises one or more member(s) selected from an oxide containing lithium, a compound containing lithium and halogen and a compound containing lithium and nitrogen.

(Constitution 13)
The electrode according to the constitution 11 or 12, wherein the inorganic solid electrolyte contains crystals of $Li_{1+x+z}M_x(Ge_{1-y}Ti_y)_{2-x}Si_zP_{3-z}O_{12}$ (in which $0 \leq x \leq 0.8$, $0 \leq y \leq 1.0$, $0 \leq z \leq 0.6$ and M is one or more element(s) selected from Al and Ga).

(Constitution 14)
The electrode according to the constitution 13, wherein the crystals are substantially free of a pore or a crystal grain boundary which inhibits the ionic conductivity.

(Constitution 15)
The electrode according to any of the constitutions 11 to 14, wherein the inorganic solid electrolyte is a lithium composite oxide glass ceramics.

(Constitution 16)
The electrode according to any of the constitutions 11 to 15, wherein the amount of the powder in the electrode is 0.1% by weight to 30% by weight to the electrode mixture containing it.

(Constitution 17)
The electrode according to any of the constitutions 11 to 16, wherein, when an average particle size of the powder is d and an average particle size of the active material in the electrode containing it is D, then d/D is from 0.002 to 200.

(Constitution 18)
The electrode according to any of the constituents 11 to 17, wherein an average particle size of the powder is not more than 20 μm.

In accordance with the present invention, powder solely comprising an inorganic solid electrolyte having lithium ionic conductivity as an electrode is added to an electrode in a lithium secondary battery where at least a fused salt at ambient temperature having ionic conductivity is used as an electrolyte whereupon it is now possible to prepare a lithium secondary battery where chemical reaction of an electrolyte with an active material for electrode under high temperature environment is suppressed, reliability is high even under a high temperature environment and a charge-discharge characteristic is enhanced.

That is due to the finding that an effect of suppression of the chemical reaction between an electrolyte and an active material for electrode under high temperature environment is achieved when powder solely comprising the above inorganic solid electrolyte is present around the active material.

Further, when much powder solely comprising the above inorganic solid electrolyte contacts the active material, the above inorganic solid electrolyte powder decreases the reaction area of the active material with the electrolyte and the effect of suppressing the chemical reaction between the electrolyte containing at least the fused salt at ambient temperature and the active material for electrode is much more enhanced.

In addition, when the powder solely comprising the inorganic solid electrolyte which has lithium ionic conductivity is added into the electrode, the powder in the electrode carries a part of the role of lithium ionic conductivity in the electrode whereby the amount of the electrolyte is able to be reduced and an improvement in safety of the lithium secondary battery is able to be achieved. Furthermore, viscosity of the fused salt at ambient temperature becomes high at low temperature and, even at the temperature range where diffusion of lithium ion is slow and charge and discharge are difficult, it is now possible to provide a battery having more discharge capacity than the conventional one.

DETAILED DESCRIPTION OF THE PREFERRED EMBODIMENTS

In the present specification, a lithium secondary battery is used for a lithium ion secondary battery where porous separator is installed between the positive and negative electrodes and an electrolyte (electrolytic liquid) having ionic conductivity is used and also for a lithium polymer secondary battery where polymer which absorbs electrolyte (electrolytic liquid) is available between the positive and negative electrodes. The advantages of the present invention are able to be achieved in all of those batteries.

The characteristic feature of the present invention is that, in a lithium secondary battery where at least a fused salt at ambient temperature having an ionic conductivity is used, at least one of the positive and negative electrodes contains the powder which solely comprises an inorganic solid electrolyte having lithium ionic conductivity.

When the powder is contained in an electrode, it is now possible that chemical reaction between the electrolyte and the active material for electrode under a high temperature environment is suppressed and lowering of properties of a lithium secondary battery using at least a fused salt at ambient temperature having ionic conductivity is suppressed.

Although there is no particular limitation for the inorganic solid electrolyte having lithium ionic conductivity, it is preferred to be an inorganic solid electrolyte comprising at least one of an oxide containing lithium, a compound containing lithium and halogen and a compound containing lithium and nitrogen because of such advantages that a charge-discharge characteristic of the battery at low temperature is improved, that a charge-discharge cycle characteristic of the battery at high temperature hardly lowers and that a property of storage characteristic is apt to be easily maintained.

Examples of the oxide containing lithium are a phosphorate type material such as $Li_{1+x}A_xB_{2-y}(PO_4)_3$ (x is Al, Ge, Sn, Hf, Zr, Sc, Y or B; B is Ti, Ge or Zn; and $0<x<0.5$), $LiMPO_4$ (M is Mn, Fe, Co or Ni) and $Li_3PO_4$; and a lithium composite oxide such as $Li_2BO_4$ and $Li_4XO_4$ (X is Si, Ge or Ti). Examples of the compound containing lithium and halogen are LiBr, LiF, LiCl and $LiBF_4$. Examples of the compound containing lithium and nitrogen are LiPON, $LiN(SO_2CF_3)_2$, $LiN(SO_2C_2F_5)_2$ and $Li_3N$.

It is more preferred that the inorganic solid electrolyte contains crystals of $Li_{1+x+z}M_x(Ge_{1-y}Ti_y)_{2-x}Si_zP_{3-z}O_{12}$ (in which $0 \le x \le 0.8$, $0 \le y \le 1.0$, $0 \le z \le 0.6$ and M is one or more element(s) selected from Al and Ga) in view of the facts that a high ionic conductivity is available and that a sufficient conductivity for playing a role of lithium ion transport in the electrode is available.

When the powder solely comprising the inorganic solid electrolyte containing the above crystals is contained in an electrode, it is now possible that an effect where a part of ionic transport in an electrode is done by a solid electrolyte is apt to be easily achieved and that an effect where lowering of ionic conductivity of the liquid electrolyte and lowering of discharge characteristic of a battery are suppressed is apt to be easily achieved. Further, an effect where deterioration of an electrolyte due to the reaction between an active material and a liquid electrolyte is suppressed is able to be achieved and discharge temperature characteristic and life of a battery are apt to be easily improved.

It is preferred that the above inorganic solid electrolyte containing the crystals is substantially free of a pore or a crystal grain boundary which inhibits the ionic conductivity. That is because, when a pore or a crystal grain boundary is present, ionic conductivity of the above inorganic solid electrolyte becomes low as compared with the ionic conductivity of the crystal particles themselves. Here, the pore and the crystal grain boundary which inhibit the ionic conductivity stand for the substances inhibiting the ionic conductivity such as a pore and a crystal grain boundary by which ionic conductivity of the whole inorganic solid electrolyte including lithium ion conductive crystals is lowered to an extent of not less than one-tenth of the conductivity of the lithium ionic conductive crystals themselves in the inorganic solid electrolyte.

As to the inorganic solid electrolyte being substantially free of a pore or a crystal grain boundary which inhibits ionic conductivity as such, an inorganic solid electrolyte comprising glass ceramics may be exemplified.

Glass ceramics is a material prepared by such a manner that glass is subjected to a heating treatment whereby a crystal phase is separated out in a glass phase and it is a material comprising an amorphous solid and crystals. Glass ceramics further includes a material where all of the glass phase is subjected to a phase transition to a crystal phase provided that pores are hardly present in the crystals and among particles of the crystals or, in other words, a material in which the crystal amount (degree of crystallization) is 100% by mass.

In common ceramics and sinters, the presence of hollow pores and grain boundary in crystals and among crystal particles is unavoidable in view of the manufacturing steps therefor. Accordingly, they are able to be discriminated from glass ceramics.

In glass ceramics, it is possible to suppress the lowering of conductivity among crystals by means of control of a crystallizing step where a crystal phase is separated out in a glass phase and, since glass ceramics has almost no pores and crystal grain boundary which inhibit the ionic conductivity, its ionic conductivity is high being able to have ionic conductivity in nearly the same degree as that of the crystal particles themselves and its chemical stability is also excellent.

Lithium composite oxide glass ceramics has been known as a solid electrolyte having high chemical stability and high lithium conductivity and, since glass ceramics has the above characteristics, it is preferred that the inorganic solid electrolyte is a lithium composite oxide glass ceramics.

Besides the glass ceramics, there may be exemplified a single crystal of the above crystals having almost no pore and crystal grain boundary which inhibit the ionic conductivity but its production is difficult and its production cost is high. Thus, glass ceramics is advantageous also in view of easy production and of low cost.

A lithium composite oxide glass ceramics having the above crystals, i.e. a glass ceramics where crystals of $Li_{1+x+z}M_x(Ge_{1-y}Ti_y)_{2-x}Si_zP_{3-z}O_{12}$ (in which $0 \le x \le 0.8$, $0 \le y \le 1.0$, $0 \le z \le 0.6$ and M is one or more element(s) selected from Al and Ga) are separated out as a crystal phase, is able to be produced in such a manner that a glass which contains 10 to 25% of $Li_2O$ and
0.5 to 15% of $Al_2O_3$ and/or $Ga_2O_3$ and
25 to 50% of $TiO_2$ and/or $GeO_2$ and
0 to 15% of $SiO_2$ and
26 to 40% of $P_2O_5$ in terms of molar % based on an oxide is melted and quickly cooled and the resulting glass is subjected to a heating treatment whereby crystals are separated out therefrom.

The term "molar % based on an oxide" is that, when it is assumed that all of oxides, nitrates, etc. used as materials of constituting components of the inorganic composition of the present invention are decomposed by fusion and are changed to oxides, the resulting amount of each component contained in the glass ceramics where the total amount of the masses of those resulting oxides is defined as 100 molar % is adopted as a composition therefor.

Hereinafter, a composition ratio of each component represented by molar % and advantages thereof will be specifically illustrated for preferred embodiments of the above composition.

An $Li_2O$ component provides an $Li^+$ ion carrier, is a component useful for resulting in a lithium ionic conductivity and is a constituting component of the above crystal phase. In order to achieve good ionic conductivity more easily, the lower limit of the content is preferably 10%, more preferably 13% and, most preferably, 14%. When the $Li_2O$ component is too much, thermal stability of the glass becomes bad and conductivity of the resulting glass ceramics by crystallization is also apt to lower. Therefore, the upper limit of the content is preferably 25%, more preferably 17% and, most preferably, 16%.

An $Al_2O_3$ component is able to enhance the thermal stability of glass and, at the same time, it is a constituting component of the above crystal phase and is also effective for enhancement of lithium ionic conductivity. In order to achieve the effect easily, the lower limit of the content is preferably 0.5%, more preferably 5.5% and, most preferably, 6%.

When, however, the content is more than 15%, thermal stability of the glass is rather apt to become bad and the conductivity of the resulting glass ceramics is also apt to become bad and, therefore, the upper limit of the content is preferred to be 15%. The upper limit of the content for easier achievement of the above effect is more preferably 9.5% and, most preferably, 9%.

It is also possible that, within the above composition range, the $Al_2O_3$ component is substituted with a $Ge_2O_3$ component either partially or wholly.

A $TiO_2$ component contributes in formation of the glass, is also a constituting component of the above crystal phase and is a useful component in the crystals in the glass as well. For such purposes of making into glass and of more easily achieving a high ionic conductivity as a result of isolation of the above crystal phase from the glass as a main phase upon crystallization, the lower limit of the content is preferably 25%, more preferably 36% and, most preferably, 37%. When the $TiO_2$ component is too much, thermal stability of the glass is apt to become bad and conductivity of the glass ceramics is also apt to become low and, therefore, the upper limit of the content is preferably 50%, more preferably 43% and, most preferably, 42%.

It is also possible that, within the above composition range, the $TiO_2$ component is substituted with a $Ge_2O_3$ component either partially or wholly.

An $SiO_2$ component is able to enhance the fusing property and thermal stability of glass and, at the same time, it may also act as a constituting component for the crystal phase, is also a component contributing in enhancement of lithium ionic conductivity and may be freely contained. In order to achieve such effects more fully, the lower limit of its content is preferably 1% and, most preferably, 2%. When, however, the content is more than 10%, the conductivity rather lowers and, therefore, the upper limit of the content is preferably 15%, more preferably 8% and, most preferably, 7%.

A $P_2O_5$ component is a component useful for the formation of glass and is also a constituting component of the crystal phase upon crystallization. When its content is less than 26%, vitrification is difficult and, therefore, the lower limit of the content is preferably 26%, more preferably 32% and, most preferably, 33%. When the content is more than 40%, the crystal phase is hardly isolated from the glass and the desired characteristic is hardly available whereby the upper limit of the content is preferably 40%, more preferably 39% and, most preferably, 38%.

A $ZrO_2$ component has an effect of promoting the production of the desired crystal phase of the present invention and is a component which is able to be optionally added. However, when its amount is more than 10%, resistance of the glass to devitrification is apt to significantly lower whereby preparation of uniform glass is apt to become difficult and, moreover, conductivity is also apt to lower. Therefore, the upper limit of the content is preferably not more than 10%. In order to able to achieve the above effect more easily, the range of the $ZrO_2$ component is preferably not more than 8% and, particularly preferably, not more than 5%. In order to achieve the above crystal phase more easily, it is more preferred that the $ZrO_2$ is contained in an amount of not less than 0.3%.

When the composition is as mentioned above, it is now possible that the molten glass is cast to easily prepare the glass and the glass ceramics having the above crystal phase prepared by a thermal treatment of the resulting glass has a lithium ionic conductivity of as high as $1\times10^{-4}$ S/cm to $1\times10^{-3}$ S/cm at 25° C.

Besides the above components, it is also possible to add an $X_2O_3$ component (where X is one or more element(s) selected from In, Fe, Cr, Sc, Y, La, Ce, Pr, Nd, Sm, Eu, Gd, Tb, Dy, Ho, Er, Tm, Yb and Lu). When such a component is added, fusing property and thermal stability of the glass may be apt to be improved and a lithium ionic conductivity of the glass ceramics after crystallization may be apt to be improved. However, too much addition is apt to rather lower the fusing property and the thermal stability of the glass and, therefore, the upper limit of the adding amount of the $X_2O_3$ component is preferably not more than 10%, more preferably not more than 8% and, most preferably, not more than 6%.

It is desirable that an alkali metal such as $Na_2O$ and $K_2O$ other than $Li_2O$ is not contained, if at all possible, in the above composition. When such a component is present in the glass ceramics, conductivity of lithium ion is inhibited and the conductivity is apt to be lowered due to a mixing action of the alkali ion.

When sulfur is added to the composition of the glass ceramics, although the lithium ionic conductivity is enhanced a little, chemical durability and stability become poor and, therefore, it is preferred that sulfur is not contained therein if at all possible. It is also desirable if at all possible that the composition of the glass ceramics does not contain the component which is possibly harmful to environment and human body such as Pb, As, Cd and Hg.

In the lithium secondary battery of the present invention, powder solely comprising an inorganic solid electrolyte having lithium ionic conductivity is contained in the electrode whereby lowering of properties of the electrolyte is suppressed. However, when the content of the lithium ion conductive inorganic solid electrolyte powder in the electrode is too much, the amount of the active material in the electrode decreases accordingly. A rate characteristic (discharge characteristic) is also apt to lower. Accordingly, in order to prepare a high-capacity battery easily, the upper limit of the content of the powder solely comprising the lithium ion conductive inorganic solid electrolyte in the electrode mixture containing the powder solely comprising the inorganic solid electrolyte is preferably not more than 30% by weight, more preferably not more than 20% by weight and, most preferably, not more than 10% by weight.

To be more specific, when the rate characteristic is good (high), it is possible to conduct the charge/discharge in a big currency quantity. In other words, it is possible to charge within short time and, moreover, to discharge in a big current quantity.

For such a purpose that the chemical reaction between the electrolyte and the active material for electrode under a high temperature environment is apt to be made suppressive, the lower limit of the content of the lithium ion conductive inorganic solid electrolyte powder in the electrode mixture including the above inorganic solid electrolyte powder is preferably not less than 0.1% by weight, more preferably not less than 1% by weight and, most preferably, not less than 3% by weight.

The electrolyte of the lithium secondary battery of the present invention uses at least a fused salt at ambient temperature having ionic conductivity. With regard to the fused salt at ambient temperature having ionic conductivity, there may be used a mixture of a fused salt such as EIM-TFSI (1-ethyl-3-methylimidazolidium-bis(trifluoromethane-sulfonyl)-imide), EMI-BF4 (1-ethyl-3-methylimidazolidium-tetrafluroborate), TMPA-TFSI (trimethylpropylammonium-bistrifluoromethylsulfonylimide) and PP13 (N-methyl-N-propylpiperidinium) with a lithium salt such as $LiBF_4$ (lithium tetrafluoroborate), $LiClO_4$ (lithium perchlorate), $LiN(SO_2CF_3)_2$ (lithium bistrifluoromethane sulfonimide), $LiN(SO_2C_2F_5)_2$ (lithium bis(pentafluoroethanesulfonyl) imide), $LiSO_3CF_3$ (lithium trifluoromethanesulfonate) and $LiPF_6$ (lithium hexafluorophosphate) and it is also possible to use various kinds of fused salts and lithium salts besides the above. The above fused salt at ambient temperature may be also mixed with a nonaqueous solvent and it is possible to mix with a non-aqueous solvent of an ester type, an ether type, a carbonate type or a ketone type which is able to dissolve a lithium salt such as EC (ethylene carbonate), DEC (diethyl carbonate), DMC (dimethyl carbonate), EMC (ethyl methyl carbonate), PC (propylene carbonate) and VC (vinylene carbonate).

An average particle size of the powder solely comprising the lithium ion conductive inorganic solid electrolyte is preferred to be within such a range that d/D is from 0.002 to 200 where d is the above average particle size and D is an average particle size of active materials in the electrode including the above. When the upper limit of the above d/D is not more than 200, volume of the solid electrolyte in the electrode is big and that is preferred in view of lithium ion diffusion in the electrode and of safety. More preferably, it is not more than 100 and, most preferably, it is not more than 5. When the lower limit of the above d/D is not less than 0.002, it is preferred since the effect of suppressing the reaction of the active material with the electrolyte containing at least the fused salt at ambient temperature is apt to be more easily available because of the fact that the solid electrolyte powder having small particle size as compared with that of the active material is present and that the possibility of its presence around the active material increases and the area contacting the active material surface increases as well. More preferably, it is not less than 0.003 and, most preferably, it is not less than 0.005.

When the particle size of the active material in the electrode and the thickness of the electrode are taken into consideration, the upper limit of the average particle size of the powder solely comprising the lithium ion conductive inorganic solid electrolyte is preferably not more than 20 μm, more preferably not more than 10 μm and, most preferably, not more than 5 μm so that the dispersing ability in the electrode is apt to be made good.

The lower limit of an average particle size of the lithium ion conductive inorganic solid electrolyte powder is preferably not less than 50 nm, more preferably not less than 100 nm and, most preferably, not less than 140 nm so that dispersion into the electrode and binding property among the electrode materials are apt to be made good.

The above average particle size is the value of D50 (accumulated 50% diameter) when measured by a laser diffraction method and, to be more specific, the value measured by a submicron particle analyzer N5 or a particle size distribution measuring apparatus LS 100 Q of Beckmann Coulter may be used. Incidentally, the above average particle size is a value expressed on the basis of volume.

With regard to the active material used for the positive electrode material of the lithium secondary battery of the present invention, a transition metal compound which is able to conduct occlusion and release of lithium may be used and a transition metal compound containing one or more element (s) selected, for example, from manganese, cobalt, nickel, vanadium, niobium, molybdenum and titanium may be used.

The positive electrode of the lithium secondary battery of the present invention contains the above active material, an electroconductive aid and a binder and, if necessary, it further contains the above lithium ion conductive inorganic solid electrolyte powder.

As to the electroconductive aid, a carbon material such as acetylene black or other known materials may be used.

As to the binder, a fluorine resin such as Pvdf (polyvinylidene fluoride) and other known materials may be used.

In the positive electrode of the present invention, an electrode mixture stands for a mixture of an active material, an electroconductive aid, a binder and a lithium ion conductive inorganic solid electrolyte powder.

As to the active material used for a negative electrode material, it is preferred to use lithium metal, an alloy which is able to occlude and release of lithium such as a lithium-aluminum alloy and a lithium-indium alloy, an oxide of transition metal such as titanium and vanadium and a carbon-type material such as graphite.

A negative electrode of the lithium secondary battery of the present invention contains the above active material and a binder and, if necessary, it further contains an electroconductive aid and a polymeric solid electrolyte which absorbs the above lithium ion conductive inorganic solid electrolyte powder or an electrolyte (electrolytic liquid) having ionic conductivity.

As to a binder, a fluorine resin such as PVDF or other known materials may be used.

In the negative electrode of the present invention, an electrode mixture stands for a mixture of an active material, an electroconductive aid, a binder and a lithium ion conductive inorganic solid electrolyte powder.

The lithium secondary battery of the present invention is prepared in such a manner that at least one of the above positive and negative electrodes is made to contain an inorganic solid electrolyte powder having lithium ionic conductivity, an porous membrane comprising polypropylene, PVDF, glass fiber membrane, etc. is positioned between the positive and negative electrodes as a separator, a collector is applied to each of the positive and negative electrodes, the resulting one is received in a case and the above electrolyte (electrolytic liquid) is infused therein.

In place of the separator of the porous membrane, it is also possible that a polymeric solid electrolyte which absorbs the electrolyte (electrolytic liquid) such as lithium ion conductive gel polymer or polymer solid electrolyte is positioned between the positive and negative electrodes, a collector is applied to each of the positive and negative electrodes, the resulting one is received in a case and the above electrolyte (electrolytic liquid) is infused therein to manufacture the battery.

EXAMPLES

Now the lithium ion lithium secondary battery and the electrodes for the lithium secondary battery according to the present invention will be illustrated by way of the following specific Examples. The present invention is not limited to the matters mentioned in the following Examples only but may be carried out with appropriate modifications so far as the gist of the present invention is not altered.

[Preparation of an Inorganic Solid Electrolyte Powder having Lithium Ionic Conductivity]

$H_3PO_4$, $Al(PO_3)_3$, $Li_2CO_3$, $SiO_2$ and $TiO_2$ were used as materials. They were weighed so as to give a composition of 35.0% of $P_2O_5$, 7.5% of $Al_2O_3$, 15.0% of $Li_2O$, 38.0% of $TiO_2$ and 4.5% of $SiO_2$ in terms of molar % on the basis of oxides, uniformly mixed, placed in a platinum pot and heated to melt for 4 hours in an electric furnace together with stirring the molten glass liquid at 1,500° C. After that, the molten glass liquid was dropped into a running water to give flaky glass. This glass was crystallized by a thermal treatment at 950° C. for 12 hours to give an aimed glass ceramics. The crystal phase separated out therefrom was subjected to a powder X-ray diffraction and was confirmed that $Li_{1+x+z}Al_xTi_{2-x}Si_zP_{3-z}O_{12}$ (in which $0 \leq x \leq 0.8$, $0 \leq y \leq 1.0$, $0 \leq z \leq 0.6$)

was a main crystal phase. This will be referred to as a glass ceramics A. Ionic conductivity of this glass ceramics A at 25° C. was about $1\times10^{-3}$ S/cm.

Then, $H_3PO_4$, $Al(PO_3)_3$, $Li_2CO_3$, $ZrO_2$, $TiO_2$ and $GeO_2$ were used as materials. They were weighed so as to give a composition of 38.0% of $P_2O_5$, 7.0% of $Al_2O_3$, 15.0% of $Li_2O$, 1.0% of $ZrO_2$, 17.0% of $TiO_2$, 20.0% of $GeO_2$ and 2% of $SiO_2$ in terms of molar % on the basis of oxides, uniformly mixed, placed in a platinum pot and heated to melt for 4 hours in an electric furnace together with stirring the molten glass liquid at 1,500° C. After that, the molten glass liquid was dropped into a running water to give a flaky glass. This glass was crystallized by a thermal treatment at 950° C. for 12 hours to give an aimed glass ceramics. The crystal phase separated out therefrom was subjected to a powder X-ray diffraction and was confirmed that $Li_{1+x}M_x(Ge_{1-y}Ti_y)_{2-x}P_{3-z}O_{12}$ (in which $0 \le x \le 0.8$, $0 \le y \le 1.0$ and M is one or more element(s) selected from Al and Ge) was a main crystal phase. This will be referred to as a glass ceramics B. Ionic conductivity of this glass ceramics B at 25° C. was about $1\times10^{-4}$ S/cm.

Flakes of each of the resulting glass ceramics A and B were disintegrated by a jet-mill of a laboratory scale and classified by a revolving roller made of zirconia to give a glass ceramics powder having an average particle size of 20 μm. The resulting powder was further disintegrated using a satellite ball mill, an attritor, a beads mill, etc. to give a glass ceramics powder having an average particle size mentioned in each of the Examples which will be described later.

Example 1

1) Preparation of Positive Electrode $LiCoO_2$ (80% by weight) as a positive electrode active material, 5% by weight of acetylene black as an electroconductive aid, 5% by weight of PVDF as a binder and 10% by weight of a glass ceramics B (average particle size: 1 μm) were mixed and then 10% by weight of NMP (N-methylpyrrolidone) was added thereto to make into a paste. The resulting paste was applied on an Al foil collector and dried at 100° C. After that, it was pressed into a thickness of 70 μm and cut into 50 mm square to prepare a positive electrode. An average particle size of the $LiCoO_2$ used hereinabove was 8 μm.

2) Preparation of Negative Electrode

A Cu foil of a thickness of 18 μm was used as a negative electrode collector. Graphite (85% by weight) as an active material, 10% by weight of PVDF as a binder and 5% by weight of a glass ceramics A (average particle size: 0.3 μm) were mixed and NMP was added thereto to make into a paste. The resulting paste was uniformly applied on a negative electrode collector and dried at 100° C. After that, it was pressed into a thickness of 60 μm and cut into 52 mm square to prepare a negative electrode. An average particle size of the graphite used hereinabove was 15 μm.

3) Preparation of Battery

The positive and negative electrodes prepared in the above 1) and 2) were layered via an porous membrane of 25 μm thickness made of polypropylene being cut into 54 mm square whereupon an electrode body was prepared. It was received in a metal-laminated resin film case. After that, EMITFSI was mixed with 50% by volume of a nonaqueous solvent (EC: DEC:VC=1:1:1 by volume) and then an electrolyte being prepared so as to make LiTFSI 1M was infused therein and impregnated in electrodes and separator followed by tightly sealing and adhering by fusion whereupon a battery was prepared.

Example 2

$LiCoO_2$ (85% by weight) as a positive electrode active material, 5% by weight of acetylene black as an electroconductive aid, 5% by weight of PVDF as a binder and 5% by weight of a glass ceramics B (average particle size: 1 μm) were mixed and then NMP was added thereto to make into a paste. The resulting paste was applied on an Al foil collector and dried at 100° C. After that, it was pressed into a thickness of 70 μm and cut into 50 mm square to prepare a positive electrode.

A negative electrode was prepared in the same manner as in Example 1 and then a battery was prepared under the same condition as in Example 1.

Example 3

$LiCoO_2$ (87% by weight) as a positive electrode active material, 5% by weight of acetylene black as an electroconductive aid, 5% by weight of PVDF as a binder and 3% by weight of a glass ceramics A (average particle size: 1 μm) were mixed and then NMP was added thereto to make into a paste. The resulting paste was applied on an Al foil collector and dried at 100° C. After that, it was pressed into a thickness of 70 μm and cut into 50 mm square to prepare a positive electrode.

Graphite (85% by weight) as a negative electrode active material, 10% by weight of PVDF as a binder and 5% by weight of glass ceramics A (average particle size: 0.3 μm) were mixed and NMP was added thereto to make into a paste. The resulting paste was uniformly applied on a negative electrode collector and dried at 100° C. After that, it was pressed into a thickness of 60 μm and cut into 52 mm square to prepare a negative electrode. An average particle size of the graphite used hereinabove was 15 μm.

The positive and negative electrodes prepared as such were used and a battery was prepared under the same condition as in Examples 1.

Example 4

$LiCoO_2$ (80% by weight) as a positive electrode active material, 5% by weight of acetylene black as an electroconductive aid, 5% by weight of PVDF as a binder and 10% weight of a glass ceramics A (average particle size: 0.3 μm) were mixed and then NMP was added thereto to make into a paste. The resulting paste was applied on an Al foil collector and dried at 100° C. After that, it was pressed into a thickness of 70 μm and cut into 50 mm square to prepare a positive electrode.

Lithium titanate (85% by weight) as a negative electrode active material, 5% by weight of acetylene black as an electroconductive aid, 5% by weight of PVDF as a binder and 5% by weight of glass ceramics A (average particle size: 0.15 μm) were mixed and NMP was added thereto to make into a paste. The resulting paste was uniformly applied on a negative electrode collector and dried at 100° C. After that, it was pressed into a thickness of 60 μm and cut into 52 mm square to prepare a negative electrode. An average particle size of the lithium titanate used hereinabove was 10 μm.

The positive and negative electrodes prepared as such were used and a battery was prepared under the same condition as in Examples 1.

Example 5

LiCoO$_2$ (85% by weight) as a positive electrode active material, 5% by weight of acetylene black as an electroconductive aid, 5% by weight of PVDF as a binder and 5% by weight of a glass ceramics A (average particle size: 0.5 μm) were mixed and then NMP was added thereto to make into a paste. The resulting paste was applied on an Al foil collector and dried at 100° C. After that, it was pressed into a thickness of 70 μm and cut into 50 mm square to prepare a positive electrode.

Lithium titanate (87% by weight) as a negative electrode active material, 5% by weight of acetylene black as an electroconductive aid, 5% by weight of PVDF as a binder and 3% by weight of glass ceramics A (average particle size: 0.15 μm) were mixed and NMP was added thereto to make into a paste. The resulting paste was uniformly applied on a negative electrode collector and dried at 100° C. After that, it was pressed into a thickness of 60 μm and cut into 52 mm square to prepare a negative electrode. An average particle size of the lithium titanate used hereinabove was 10 μm.

The positive and negative electrodes prepared as such were used and a battery was prepared under the same condition as in Examples 1.

Example 6

LiCoO$_2$ (87% by weight) as a positive electrode active material, 5% by weight of acetylene black as an electroconductive aid, 5% by weight of PVDF as a binder and 3% by weight of a glass ceramics A (average particle size: 0.3 μm) were mixed and then NMP was added thereto to make into a paste. The resulting paste was applied on an Al foil collector and dried at 100° C. After that, it was pressed into a thickness of 70 μm and cut into 50 mm square to prepare a positive electrode.

Lithium titanate (85% by weight) as a negative electrode active material, 5% by weight of acetylene black as an electroconductive aid, 5% by weight of PVDF as a binder and 5% by weight of glass ceramics A (average particle size: 0.15 μm) were mixed and NMP was added thereto to make into a paste. The resulting paste was uniformly applied on a negative electrode collector and dried at 100° C. After that, it was pressed into a thickness of 60 μm and cut into 52 mm square to prepare a negative electrode. An average particle size of the lithium titanate used hereinabove was 10 μm.

The positive and negative electrodes prepared as such were used and a battery was prepared under the same condition as in Examples 1.

Comparative Example 1

LiCoO$_2$ (90% by weight) as a positive electrode active material, 5% by weight of acetylene black as an electroconductive aid and 5% by weight of PVDF as a binder were mixed and then NMP was added thereto to make into a paste. The resulting paste was applied on an Al foil collector and dried at 100° C. After that, it was pressed into a thickness of 70 μm and cut into 50 mm square to prepare a positive electrode.

Graphite (90% by weight) as a negative electrode active material and 10% by weight of PVDF as a binder were mixed and NMP was added thereto to make into a paste. The resulting paste was uniformly applied on a negative electrode collector and dried at 100° C. After that, it was pressed into a thickness of 60 μm and cut into 52 mm square to prepare a negative electrode. An average particle size of the graphite used hereinabove was 15 μm.

The positive and negative electrodes prepared as such were used and a battery was prepared under the same condition as in Examples 1.

Comparative Example 2

A positive electrode was prepared by the same manner as in Comparative Example 1.

Lithium titanate (40% by weight) as a negative electrode active material, 5% by weight of acetylene black as an electroconductive aid, 5% by weight of PVDF as a binder and 50% by weight of the glass ceramics A (particles having an average particle size of not smaller than 46 μm) were mixed and NMP was added thereto to make into a paste. The resulting paste was uniformly applied on a negative electrode collector and dried at 100° C. After that, it was pressed into a thickness of 60 μm and cut into 52 mm square to prepare a negative electrode. An average particle size of the lithium titanate used hereinabove was 10 μm.

The positive and negative electrodes prepared as such were used and a battery was prepared under the same condition as in Examples 1.

All of the batteries prepared hereinabove were subjected to an aging treatment at 60° C. for 12 hours and then subjected to the following charge/discharge tests. Thus, the batteries of Examples 1 to 3 and Comparative Example 1 were fully charged by means of charging at constant current and constant voltage up to 4.2 V at room temperature and then discharged at the current value of ⅙ C until the final discharge voltage of 2.7 V. With regard to the batteries of Examples 4 to 6 and Comparative Example 2, they were fully charged by means of charging at constant current and constant voltage up to 2.7 V at room temperature and then discharged at the constant current of ⅙ C until the final discharge voltage of 1.4 V. After that, the same charge-discharge cycle was repeated under the high temperature environment atmosphere of 60° C. and the result of measurement of capacity maintaining rate of the fiftieth cycle to the second cycle is shown in Table 1.

In Examples 1 to 8 and Comparative Example 1, the charge/discharge for not less than 50 cycles was possible while, in Comparative Example 2, no capacity was available from the third cycle and thereafter.

TABLE 1

| | Fused Salt at Ambient Temp | Amount (wt %) of Solid Electrolyte in Electrode | | Average Particle Size (μm) of Solid Electrolyte | | d/D | | Capacity Maintaining Rate (%) |
|---|---|---|---|---|---|---|---|---|
| | | Positive Electrode | Negative Electrode | Positive Electrode | Negative Electrode | Positive Electrode | Negative Electrode | |
| Ex. 1 | EMI-TFSI, | 10 | 5 | 1 | 0.3 | 0.125 | 0.02 | 72 |
| Ex. 2 | EC + | 5 | 5 | 1 | 0.3 | 0.125 | 0.02 | 78 |

TABLE 1-continued

|  | Fused Salt at Ambient Temp | Amount (wt %) of Solid Electrolyte in Electrode | | Average Particle Size (μm) of Solid Electrolyte | | d/D | | Capacity Maintaining Rate (%) |
| --- | --- | --- | --- | --- | --- | --- | --- | --- |
|  |  | Positive Electrode | Negative Electrode | Positive Electrode | Negative Electrode | Positive Electrode | Negative Electrode |  |
| Ex. 3 | DEC + VC, | 3 | 5 | 1 | 0.3 | 0.125 | 0.02 | 77 |
| Ex. 4 | LiTFSI | 10 | 5 | 0.3 | 0.15 | 0.038 | 0.015 | 85 |
| Ex. 5 |  | 5 | 3 | 0.3 | 0.15 | 0.038 | 0.015 | 90 |
| Ex. 6 |  | 3 | 5 | 0.3 | 0.15 | 0.038 | 0.015 | 88 |
| Comparative Ex 1 |  | 0 | 0 |  |  |  |  | 32 |
| Comparative Ex. 2 |  | 0 | 50 |  | 46 |  | 4.6 |  |

Then the batteries of Examples 1 to 3 and Comparative Example 1 were fully charged up to 4.2 V while those of Examples 4 to 6 were fully charged up to 2.7 V. After that, each of them was short-circuited. The result was that, in the battery of Comparative Example 1, the battery cell became hot and swollen. However, in Examples 1 to 6, there was no change in the battery cells. Then the batteries of Examples 3 and Comparative Example 1 were charged and discharged at room temperature, charged once again and stored at 80° C. for 30 days. Each of the batteries was discharged at the current value of 1/6 C and the residual capacity where the initial discharge capacity was defined 100% was measured. The residual capacity of Example 1 was 84% while, in Comparative Example 1, it was 9%. It was noted therefrom that, in the batteries using a fused salt at ambient temperature being equipped with electrodes containing lithium composite oxide glass ceramics, their high temperature cycle life, storage characteristic and safety were improved as compared with the conventional batteries.

Further, each of the batteries of Examples 1 to 6 was fully charged at room temperature by means of charging at constant current and constant voltage at the final charge voltage mentioned in each Example and then it was discharged at the current value of 1/6 C until each of the final discharge voltage. After that, it was fully charged by means of charging at constant current and constant voltage once again. In the discharge of the second cycle, discharge was conducted at the current value of 1/2 C until each of the final discharge voltage. The batteries prepared in Examples 1 to 8 had not less than 90% of the initial discharge capacity. After that, it was fully charged once again by means of charging at constant current and constant voltage until the final discharge voltage for each battery and discharged at the current value of 1/3 C at 0° C. Discharge capacity of each battery had not less than 60% of the initial discharge capacity and the battery was found to be excellent in a low-temperature characteristic as well. Consequently, it was found that the battery of the present invention has a rate characteristic and has high safety.

What is claimed is:

1. A lithium secondary battery comprising:
   a positive electrode;
   a negative electrode; and
   an electrolyte comprising ambient-temperature-fused salt having ionic conductivity,
   wherein at least one of the positive and negative electrodes contains a powder consisting of lithium composite oxide glass ceramics having lithium ionic conductivity,
   wherein said lithium composite oxide glass ceramics comprises $Li_{1+x+z}M_x(Ge_{1-y}Ti_y)_{2-x}Si_zP_{3-z}O_{12}$, in which $0 \leq x \leq 0.8$, $0 \leq y \leq 1.0$, $0 \leq z \leq 0.6$ and M is one or more element(s) selected from Al and Ga, and
   wherein the ambient-temperature-fused salt comprises one or more selected from the group consisting of EIM-TFSI (1-ethyl-3-methylimidazolidium-bis(trifluoromethanesulfonyl)-imide), EMI-BF4 (1-ethyl-3-methylimidazolidium-tetrafluoroborate), TMPA-TFSI (trimethylpropylammonium-bistrifluoromethylsulfonylimide) and PP13 (N-methyl-N-propylpiperidinium) with a lithium salt such as $LiBF_4$ (lithium tetrafluoroborate), $LiClO_4$ (lithium perchlorate), $LiN(SO_2CF_3)_2$ (lithium bistrifluoromethane sulfonimide), $LiN(SO_2C_2F_5)_2$ (lithium bis(pentafluoroethanesulfonyl)imide), $LiSO_3CF_3$ (lithium trifluoromethanesulfonate) and $LiPF_6$ (lithium hexafluorophosphate).

2. The lithium secondary battery according to claim 1, wherein at least one of the positive electrode and the negative electrode contains a polymeric solid electrolyte which absorbs the salt fused at ambient temperature having ionic conductivity.

3. The lithium secondary battery according to claim 1, wherein a separator positioned between the positive electrode and the negative electrode is equipped therewith.

4. The lithium secondary battery according to claim 1, wherein said lithium composite oxide glass ceramics comprises crystals, and the crystals are substantially free of a pore or a crystal grain boundary which inhibits the ionic conductivity.

5. The lithium secondary battery according to claim 1, wherein the amount of the powder in the electrode is 0.1% by weight to 30% by weight to an electrode mixture containing it.

6. The lithium secondary battery according to claim 1, wherein, when an average particle size of the powder is d and an average particle size of the active material in the electrode containing it is D, then d/D is from 0.002 to 200.

7. The lithium secondary battery according to claim 1, wherein an average particle size of the powder is not less than 50 nm and not more than 20 μm.

8. The lithium secondary battery according to claim 1, wherein the lithium composite oxide glass ceramics comprises crystals of $Li_{1+x+z}M_x(Ge_{1-y}Ti_y)_{2-x}Si_zP_{3-z}O_{12}$ (in which $0<x \leq 0.8$, $0<y \leq 1.0$, $0<z \leq 0.6$ and M is Al).

9. The lithium secondary battery according to claim 8, wherein the crystals are substantially free of a pore or a crystal grain boundary which inhibits the ionic conductivity.

10. The lithium secondary battery according to claim 1, wherein lithium composite oxide glass ceramics is substantially free of pores.

* * * * *